United States Patent [19]

Eiden

[11] Patent Number: 4,890,599
[45] Date of Patent: Jan. 2, 1990

[54] SOLAR PANEL MOUNTING ASSEMBLY
[76] Inventor: Glenn E. Eiden, 302 U.S. 30 East, New Haven, Ind. 46774
[21] Appl. No.: 193,292
[22] Filed: May 11, 1988

Related U.S. Application Data

[63] Continuation-in-part of Ser. No. 40,368, Apr. 16, 1987, Pat. No. 4,794,909.

[51] Int. Cl.⁴ ............................................... F24J 2/38
[52] U.S. Cl. .................................. 126/424; 126/425; 248/183
[58] Field of Search .................... 126/424, 425; 74/89; 248/122, 183, 186, 278, 184, 185; 250/203 R; 343/878, 912, 757, 763, 766, 882; 350/637; 353/3

[56] References Cited

U.S. PATENT DOCUMENTS

| | | | |
|---|---|---|---|
| 3,889,531 | 6/1975 | Suga | 73/150 |
| 4,090,498 | 5/1978 | Benson | 126/271 |
| 4,202,321 | 5/1980 | Volna | 126/425 |
| 4,276,872 | 7/1981 | Blake et al. | 126/425 |
| 4,295,621 | 10/1981 | Siryj | 248/183 |
| 4,300,537 | 11/1981 | Davis | 126/437 |
| 4,383,520 | 5/1983 | Huebl et al. | 126/424 |
| 4,402,582 | 9/1983 | Rhodes | 126/424 |
| 4,586,488 | 5/1986 | Noto | 126/425 |
| 4,626,864 | 12/1986 | Micklethwaite | 248/183 |

FOREIGN PATENT DOCUMENTS 59-15306  1/1984  Japan .................................. 343/882
325983  9/1930  United Kingdom ................ 248/185

Primary Examiner—Noah P. Kamen
Attorney, Agent, or Firm—George Pappas

[57] ABSTRACT

A solar tracking control system selectively energizes and deenergizes a motor. The motor causes a rotatable shaft supported on a base and situated parallel to the earth's axis of rotation to be rotated. A U-member is connected to the rotatable shaft and to a frame upon which there is mounted a solar panel or collector. A bracket is connected to each of the two U-member legs and to the frame. Two reinforcing walls are connected to the U-member legs and the U-member middle portion so as to reinforce and retain the U-member shape. By selectively rotating the rotatable shaft, the solar panel or collector is pivoted in a substantially perpendicular position to the sun throughout the day. In another mounting assembly, the frame is connected to a first plate having a pivot hole and a plurality of equidistant angle displacement holes. A second plate is connected to the base and has a pivot hole and an angle displacement hole. A pivot shaft is received through the pivot holes thereby allowing the frame to pivot. An angle displacement shaft is selectively received through the second plate angle displacement hole and any one of the first plate angle displacement holes so as to selectively angularly fix the frame and solar panel or collectors to more substantially be perpendicular to the sun during the various seasons of the year.

19 Claims, 6 Drawing Sheets

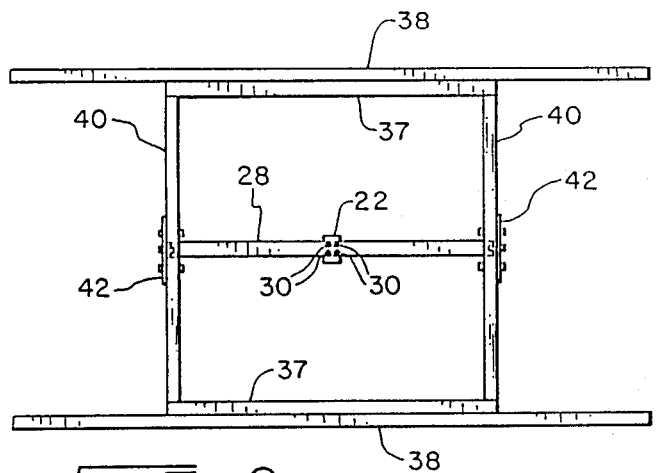
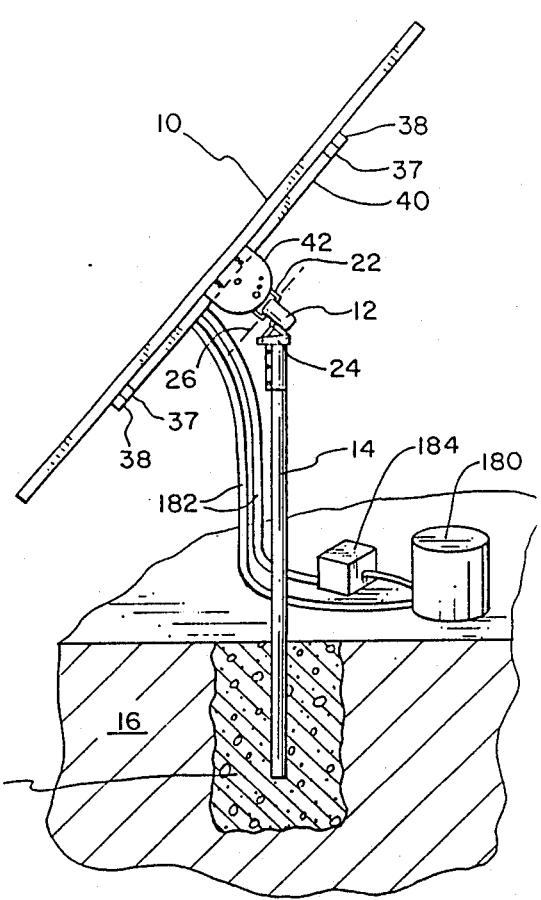
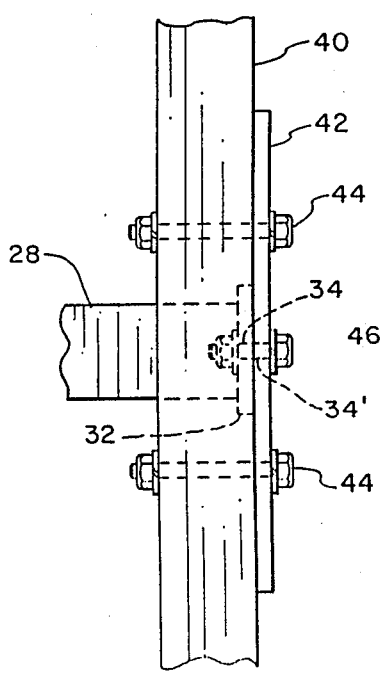
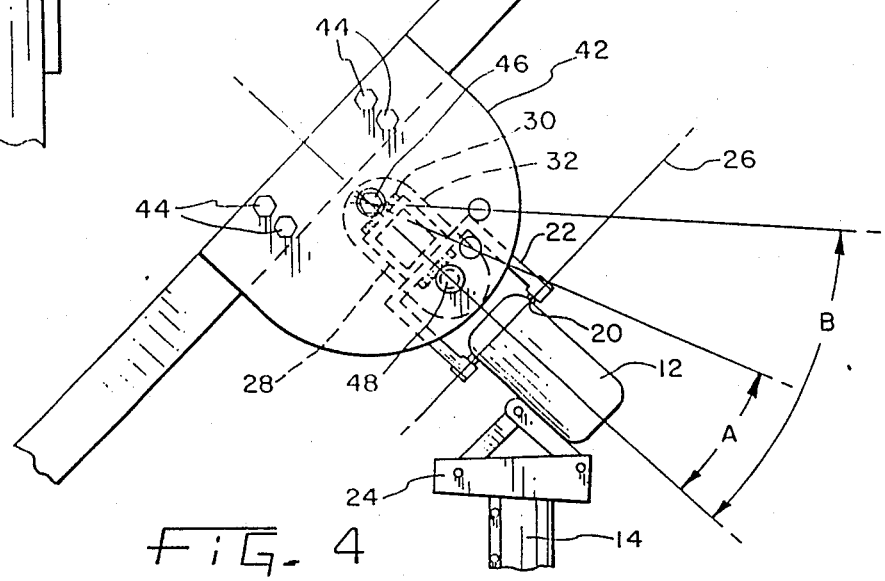

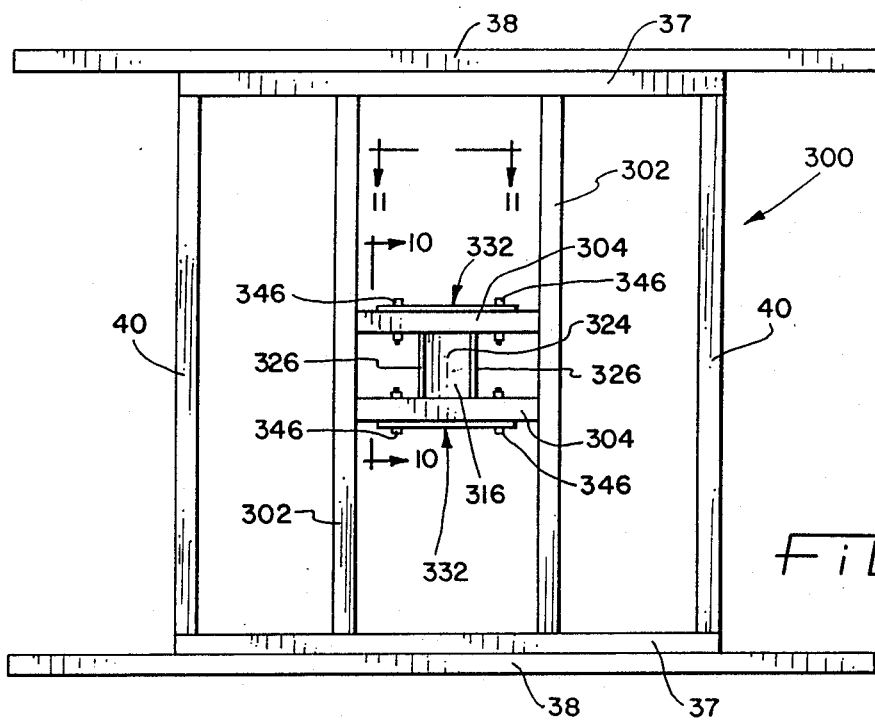
FIG. 9
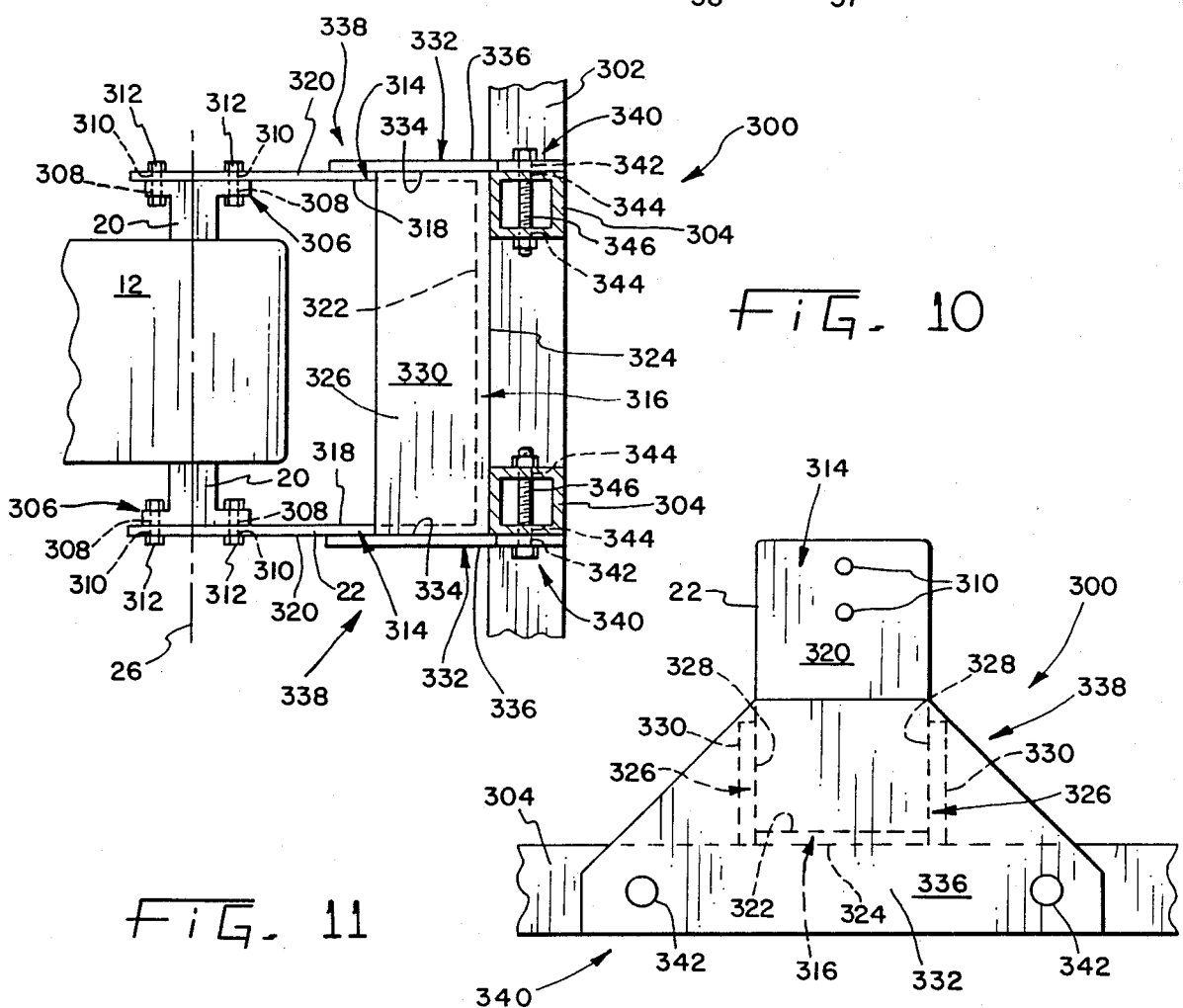
FIG. 10
FIG. 11

SOLAR PANEL MOUNTING ASSEMBLY

This application is a continuation-in-part of application Ser. No. 040,368 filed Apr. 16, 1987, now U.S. Pat. No. 4,794,909.

BACKGROUND OF THE INVENTION

The present invention relates to a solar tracking control system for controlling the position of a solar panel so that the solar panel is generally situated substantially perpendicular to the sun. The present invention also relates to a solar panel mounting assembly for rigidly mounting a solar panel to a motor shaft whereby, by controlling the motor shaft rotation, the solar panel connected to the mounting assembly is pivoted with the motor shaft and situated substantially perpendicular to the sun.

In recent times, due to energy shortages, it has become increasingly common to seek alternative energy sources. One such energy source is the sun. Solar panels, or collectors, have become commercially available for the purpose of drawing energy from the sun and using that energy to heat water, air, or other mediums. Other types of solar panels include photovoltaic devices which directly create electrical energy from the sun's rays. Naturally, the collected energy is thereafter often stored in some sort of energy bank and used for heating homes, water supplies, and powering various electrical devices, etc.

It is known that solar panels are most efficient in collecting the sun's energy when they are situated substantially perpendicular to the sun. Further, it is known that the overall efficiency of the solar panels can be increased by pivoting the panels throughout the day so that they are generally continually situated substantially perpendicular to the sun. In this fashion, efficiency is increased and the number of solar panels for any particular purposes is decreased thereby also decreasing the overall cost of the system.

Various mechanisms and methods have been developed for controlling the pivoting of solar panels so as to generally continually situate the solar panels perpendicular to the sun. The prior art solar tracking systems mostly depend on an optical system which will degrade with time due to the sun's rays, and they require adjustment periodically. They tend to be inefficient and prone to break down because very often, common motor clocks, mechanical parts and contacts are utilized for positioning the solar panels. Further, other systems are set up to continuously run or operate and, therefore, consume energy needlessly and are also more likely to break down over a period of time.

Problems also exist in the pivotal mounting of solar panels so that they may effectively withstand forces created by wind, snow, storms, etc. The prior art solar panel mounting assemblies tend to also be bulky and substantially expensive thereby generally preventing the use thereof by common households.

It is, therefore, the object of this invention to provide a solar tracking control system wherein the solar position is tracked in an efficient minimum energy consuming manner under any cloud condition. Further, it is the object of this invention to track the solar position in a time dependent fashion only in a westerly direction during the day so as to eliminate backtracking which has often occurred with systems utilizing photosensors. Further yet, it is the object of the present invention to provide an inexpensive and yet accurate solar tracking control system minimizing mechanical parts so as to decrease the probability of breakdown.

It is also the object of this invention to provide a solar panel mounting assembly whereby a solar panel can be pivotally mounted to a support and be rigid and structurally sound so as to be capable of withstanding forces to which the solar panel is subjected and caused through wind, snow, storms, etc. Further, it is the object of the present invention to provide a mounting assembly which is not only structurally sound but is also substantially inexpensive to manufacture, both in terms of material and time needed to assemble.

SUMMARY OF THE INVENTION

The solar tracking control system and mounting assembly, according to the present invention, is designed to overcome the above-discussed disadvantages associated with prior art solar tracking systems and assemblies.

The solar tracking control system generally controls the position of a pivotable solar panel by selectively energizing and de-energizing a motor which is connected to the solar panel. The pivot axis of the solar panel is situated substantially parallel to the earth's axis of rotation. A time controlled signal programmer is provided for generating a plurality of time dependent signals which are, thereafter, utilized in generating the various control signals. The signal programmer is time dependent via a 60 Hz input from a regular house outlet. A means for generating periodic motor energizing signals generally including various gates is provided and causes a cross coupled NAND gate cell to latch and, thereby, retain the motor energized and the solar panel pivoting in the westerly direction. A means for detecting the degree of pivot of the solar panel generally including a hall effect generator and sensor and a counter is provided so as to detect a preselected degree of pivot and reset the cross coupled NAND gate cell thereby de-energizing the motor and stopping the westerly pivoting of the solar panel. The counter resets itself when resetting the NAND gate cell thereby preparing itself for the next count. This process of generating a motor energizing signal, causing the solar panel to pivot and stopping the pivoting of the solar panel in response to the counter providing a de-energizing signal is repeated throughout a period during which a fixed automatic signal is at zero or low thereby causing the solar panel to pivot westerly generally following the sun during the period of which the fixed automatic signal is zero.

The solar tracking control system is energized and deenergized in response to a power signal which is generated by a power signal generating means which operates in response to a plurality of time dependent signals received from the signal programmer. In essence, a power switch means which includes a coil and contacts are utilized for selectively providing electrical power to the solar tracking control system in response to the power signal.

The solar panel is connected to an energy bank such as a water storage tank for holding the energy collected by the solar panels and a means for transferring the energy from the solar panels to the energy bank, such as a water pump, is provided. An east/west signal generating means is connected to the signal programmer and generates an east/west signal in response to a plurality of time dependent signals received from the signal programmer. An overload determining means such as a temperature sensitive switch is connected to the storage tank or the energy bank such as a water storage tank so as to determine an overload, such as the occurrence of exceeding a preselected temperature or the occurrence of an overvoltage condition of an electrical storage bank. A switch means is provided and is connected to the east/west signal generating means capable of overriding the latch means and pivoting the solar panel away from direct sunlight in response to an overload determination and in response to the east/west signal. A water pump may be fluidly connected between a water storage tank and the solar panel and can be selectively energized so as to transfer heat collected by the solar panel to the water storage tank upon the occurrence of a preselected temperature difference between the solar panel and the water storage tank.

The present invention overcomes the prior art disadvantages by substantially eliminating mechanical parts. Thus, the overall solar tracking system is less prone to breakdown. Further, the solar tracking control system is more efficient to operate in that it is energized only when needed during daylight. Further, by utilizing low energy consumption electrical parts, overall efficiency is also increased in that when the solar tracking control system is energized, a minimal amount of energy is consumed. In general, the solar tracking control system is efficient because during the day, solar tracking occurs in a time dependent fashion only in the westerly direction and the solar panel is not permitted to back track unless an overtemperature or overload condition occurs such that direct sunlight must be avoided. Further yet, the solar tracking control system of the present invention, by utilizing electrical integrated circuitry and by utilizing a signal programmer dependent on a common 60 Hz outlet, is generally inexpensive and yet substantially accurate.

A mounting assembly is provided for more rigidly connecting the solar panel or collector to the base so as to withstand winds, snow, storms, etc. The mounting assembly includes a frame whereupon a solar panel or collector can be mounted. A U-member having two legs interconnected by a middle portion is connected to the frame through the use of two brackets. The legs are substantially parallel to one another and perpendicular to the middle portion and, are also connected to a selectively rotatable shaft which is supported on the base. By rotating the shaft through the use of a motor which is controlled by the solar tracking control system, the U-member along with the frame and solar panel or collector is pivoted so as to substantially follow the sun. Two reinforcing walls are also provided and connected to the middle portion and both of the legs of the U-member so as to support the U-member and retain the legs substantially perpendicular to the middle portion.

Another mounting assembly is provided for pivotally connecting a solar panel or collector to a base so as to pivot the panel or collector throughout the various seasons. In this mounting assembly, a first plate is connected to the frame and the plate has a pivot hole and a plurality of angular displacement holes situated equidistant from the pivot hole. A second plate is connected to the base and is situated substantially parallel to the first plate and has a pivot hole and an angle displacement hole. The pivot hole and angle displacement hole of the second plate are situated substantially the same distance apart as the distance between the pivot and displacement holes of the first plate. A pivot shaft or bolt is received through the first plate pivot hole and the second plate pivot hole so that the frame can pivot with respect to the base. An angle displacement shaft or bolt is selectively received through the second plate angle displacement hole and any one of the first plate angle displacement holes thereby selectively angularly fixing the solar panel or collector to be more substantially perpendicular to the sun during the various seasons of the year.

In one form thereof, the present invention relates to a mounting assembly for pivotally connecting a solar panel or collector to a selectively rotatable shaft. The mounting assembly includes a frame whereupon the solar panel or collector can be mounted and a U-member having two legs connected to the frame. The two legs are connected to the selectively rotatable shaft and the solar panel or collector is pivoted by rotating the shaft.

In one form thereof, the present invention relates to a mounting assembly for pivotally connecting a solar panel or collector to a selectively rotatable shaft. The mounting assembly includes a frame whereupon the solar panel or collector is mounted. A U-member is provided having two substantially flat legs each of which have an inner face and an outer face and are connected to a middle flat portion also having an inner face and an outer face. The middle portion of the U-member is substantially perpendicular to both of the legs. Two substantially flat mounting brackets having an inner face and an outer face are provided. One of the mounting brackets is connected to one of the legs with the mounting bracket inner face opposing the one leg outer face and is also connected to the frame. The other mounting bracket is connected to the other of the legs with the mounting bracket inner face opposing the other leg outer face and is also connected to the frame. Two substantially flat reinforcing walls are also provided. The reinforcing walls are connected to the middle portion and both of the legs of the U-member and, thus, keep the legs perpendicular to the middle portion. The two legs are connected to the selectively rotatable shaft and the solar panel or collector is pivoted by rotating the shaft.

In one form thereof, the present invention relates to a mounting assembly for pivotally connecting a solar panel or collector to a base. The mounting assembly includes a frame whereupon the solar panel or collector can be mounted and a first plate connected to the frame. The first plate has a pivot hole and a plurality of angle displacement holes thereon. Each of the displacement holes are equidistant from the pivot hole. A second plate is connected to the base and is situated substantially parallel to the first plate. The second plate has a pivot hole and an angle displacement hole which are situated substantially the same distance apart from each other as the distance between the pivot hole and displacement holes of the first plate. A pivot shaft is received through the first plate pivot hole and the second plate pivot hole so that the frame and first plate can pivot with respect to the second plate and the base. An angle displacement shaft is selectively received through the second plate angle displacement hole and any one of the first plate angle displacement holes so that the first plate can be selectively angularly fixed with respect to the second plate and the base.

BRIEF DESCRIPTION OF THE DRAWINGS

The above-mentioned and other features and objects of this invention and the manner of attaining them will become more apparent and the invention itself will be better understood by reference to the following description of an embodiment of the invention, taken in conjunction with the accompanying drawings wherein:

FIG. 1 is a side elevational view of a solar energy collector system utilizing a solar panel, a water pump and a water storage tank according to the present invention;

FIG. 2 is a top plan view of the frame of the solar collector mount shown in FIG. 1;

FIG. 3 is a blown up top plan view of a portion of the frame shown in FIG. 1;

FIG. 4 is a blown up side elevational view of the collector frame and motor shown in FIG. 1 and showing more clearly the pivoting of the solar panel to accommodate the various seasons;

FIG. 9 is a top plan view of another embodiment of a frame and mounting assembly of the solar collector mount shown in FIG. 1;

FIG. 10 is a side elevational view of the frame and mounting assembly shown in FIG. 9 taken along line 10—10; and, FIG. 11 is a top plan view of the frame and mounting assembly shown in FIG. 9 taken along line 11—11.

Corresponding reference characters indicate corresponding parts throughout the several views of the drawings.

Figure 5A:
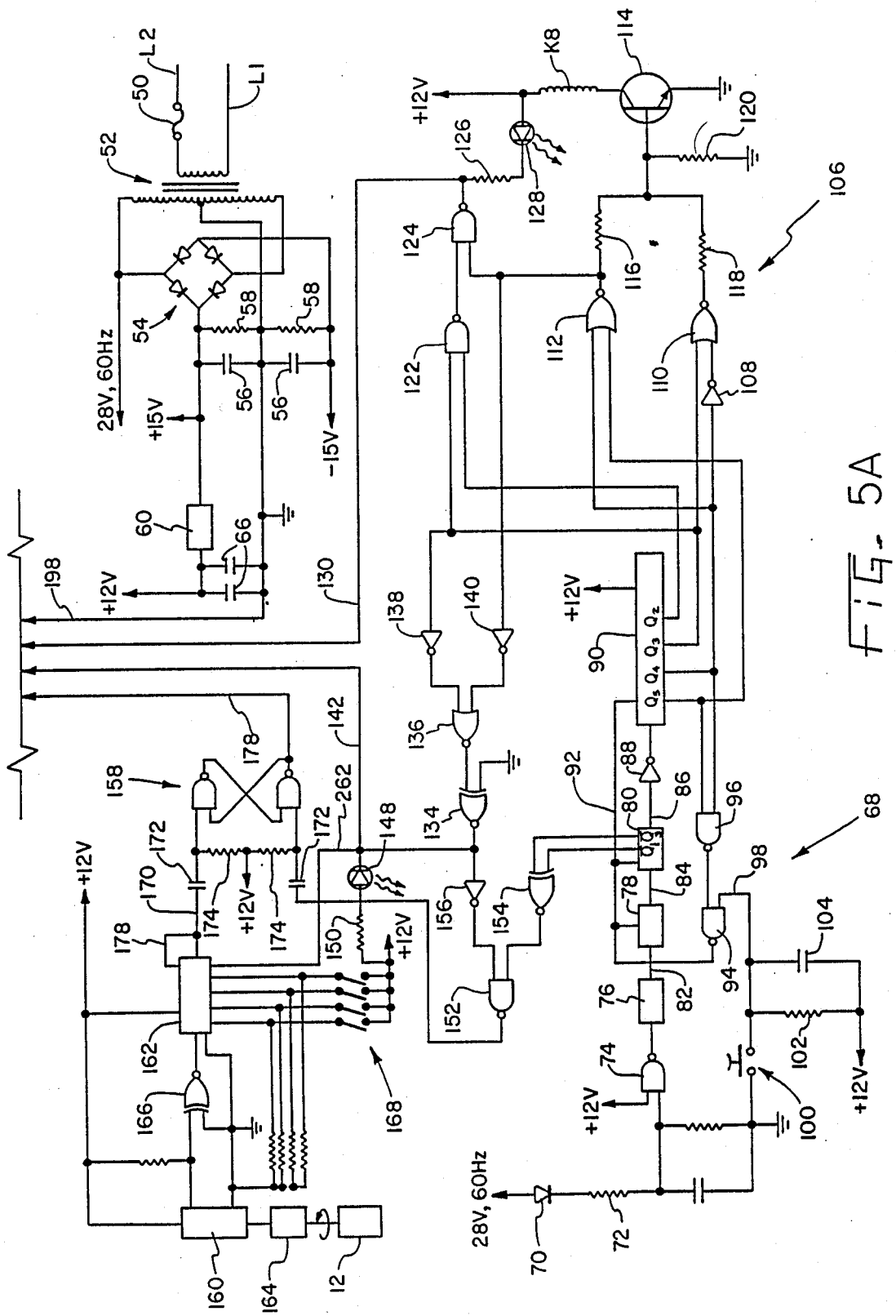
FIGS. 5a and 5b are an electrical schematic of the solar tracking control system according to the present invention for controlling the pivoting of the solar collector shown in FIG. 1 about the pivot axis which is situated substantially parallel to the earth's axis of rotation.

The exemplifications set out herein illustrate a preferred embodiment of the invention in one form thereof and such exemplifications are not to be construed as limiting the scope of the disclosure or the scope of the invention in any manner.

DETAILED DESCRIPTION OF A SPECIFIC EMBODIMENT

As shown in the figures, a specific embodiment of the present invention includes a solar tracking control system for use in controlling the position of a pivotable solar panel connected to a motor by selectively energizing and de-energizing the motor. More specifically, a solar panel 10 is provided for collecting the sun's energy and is pivotally mounted to a motor 12, which in turn is connected to a base or post 14. Post 14 is embedded in the ground 16 through the use of concrete 18 or, in other suitable fashions. Post 14 is mounted substantially perpendicular to the earth's surface.

As more clearly shown in FIGS. 2-4 and 8, motor 12 has a rotating or selectively rotatable shaft 20 upon which there is mounted U-member 22. Motor 12 is mounted upon post 14 through the use of a motor mounting base 24 and so that the axis 26 of motor shaft 20 is situated directionally north/south or, substantially parallel to the earth's axis of rotation. Accordingly, U-member 22 and solar panel 10, connected to shaft 20, rotate substantially parallel to the earth's axis of rotation.

Figure 7:
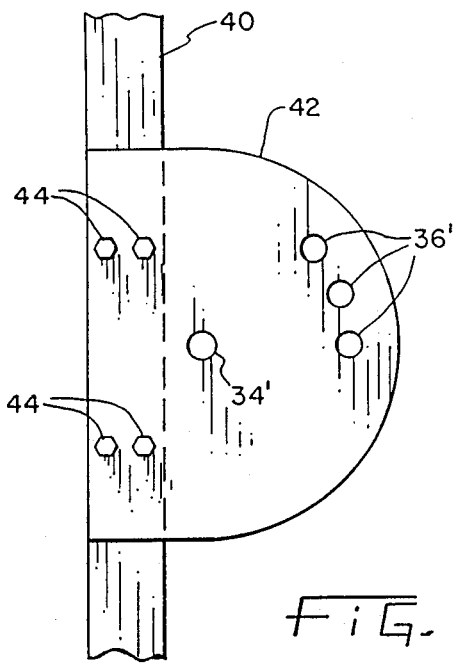
FIG. 7 is a side elevational view of the frame portion shown in FIG. 3.
Figure 8:
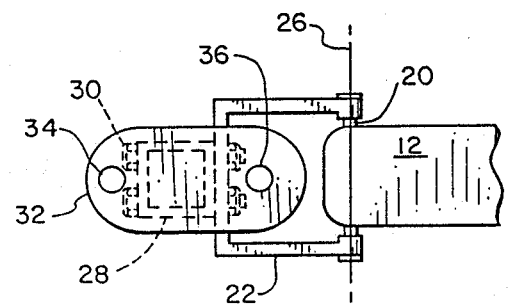
FIG. 8 is a side elevational view of the motor and oval member shown in FIG. 4.

As more clearly shown in FIG. 2, square bar member 28 is connected to U-member 22 through the use of bolts 30. On each end of square bar member 28, there is connected, by welding or other suitable means, an oval or flat plate member 32. Each of the oval members 32 has a first pivot hole 34 and a second angle displacement hole 36 for the purpose of pivotally supporting solar panel 10 as described hereinbelow. More particularly, solar panel 10 is supported on a frame including horizontal beams 37 and 38 and vertical beams 40. Beams 37 and 40 are connected together to substantially form a square. Vertical beams 40 are connected to half circle plates 42 though the use of bolts 44. Half circle plates 42, as shown in FIG. 7, each have a pivot hole 34' corresponding with first holes 34 of oval members 32. Half circle plates 42 also have three angle displacement holes 36' for selectively corresponding with the second holes 36 of oval members 32. A pivot shaft or bolt 46 is received through each first hole 34 and pivot hole 34' thereby pivotally holding together oval members 32 and half circle plates 42 on each end of square bar member 28. Furthermore, selectively received angle displacement shafts or bolts 48 are received through each of the second holes 36 of oval members 32 and one of the angle displacement holes 36' of each of the half circle plates 42, as more clearly shown in FIG. 4.

The angle displacements shafts or bolts 48 are selectively received through the oval member second hole 36 and any of the displacement holes 36' of the half circle plates 42 so that the frame and solar panel 10, along with plates 42, can be selectively angularly fixed with respect to oval members 32 and mounting base 24. Accordingly, by placing the angle displacement bolts 48 in the various angle displacement holes 36', solar panel 10 can be pivoted so as to more substantially be perpendicular to the sun during the various seasons of the year. That is, in the north hemisphere, solar panel 10 may be pivoted to angle B generally during the summer months, to angle A generally during the spring and fall months, and in a position as shown in FIG. 4, generally during the winter months. So as to further increase efficiency, solar panel 10 is pivoted daily from east to west so as to be substantially perpendicular to the sun through the use of the solar tracking control system as described hereinbelow.

For more rigidly connecting the solar panel or collector to withstand winds, snow, etc., a mounting assembly generally designated as 300 in FIGS. 9-11 is provided. As shown in FIG. 9, a frame for supporting or mounting thereon a solar panel or collector is provided and includes horizontal beams 37 and 38 and vertical outer beams 40 and vertical inner beams 302. All of beams 37, 38, 40 and 302 are square bars connected together by welding or other suitable means. The frame further includes two square beams 304 connected such as by welding between vertical inner beams 302. As such, the frame is substantially flat and capable of supporting common solar panels and collectors.

As described hereinabove, motor 12 mounted on post 14 includes a shaft 20 having an axis of rotation 26. Shaft 20 is selectively rotated through the use of the solar tracking control system described hereinbelow. Shaft 20 includes flange portions 306 which can be integrally connected to shaft 20 or connected thereto by other suitable means. Flange portions 306 include holes 308 which are aligned with U-member holes 310. Bolts 312 are received through holes 308 and 310 thereby rigidly connecting shaft 20 and flange portion 308 to U-member 22 and, thus, causing U-member 22 to pivot with shaft 20.

U-member 22 has two legs 314 which are connected to one another by middle portion 316. Legs 314 are substantially flat and have an inner face 318 and an outer face 320. U-member middle portion 316 is also substantially flat and has an inner face 322 and an outer face 324. U-member 22 can be made of, for example, one-quarter inch thick steel bent to form legs 314 and middle portion 316 thereby making legs 314 integral with middle portion 316. In the alternative, legs 314 and middle portion 316 can be separate pieces connected together by welding or other suitable means. Legs 314 are situated substantially parallel to one another and perpendicular to middle portion 316 and shaft 20.

To reinforce and retain legs 314 substantially perpendicular to middle portion 316, as substantially flat reinforcing wall 326 is connected by welding or other suitable means to both sides of U-member 22. Reinforcing walls 326 are substantially rectangularly-shaped and are each connected to respective edges of legs 314 and the edge of middle portion 316 on one side thereof. Reinforcing walls 326 are made of one-quarter inch thick steel or other suitable material and have an inner face 328 and an outer face 330. As shown in FIG. 11, inner faces 328 of reinforcing walls 326 oppose one another.

To further aid in rigidly connecting U-member 22 to the frame, there are provided mounting brackets 332 connected to U-member 22 and reinforcing walls 326 by welding or other suitable means. Mounting brackets 332 are made of one-quarter inch thick steel or other suitable material and have an inner face 334 and an outer face 336. Inner face 334 of mounting brackets 332 opposes outer face 320 of U-member legs 314. Brackets 332 have a back frusto-triangular portion 338 and a forwardly extending portion 340. Forwardly extending portion 340 extends beyond U-member middle portion 316 substantially the same length as the width of square beams 304. Mounting bracket forwardly extending portions 340 have holes 342 which are aligned with square beam holes 344. Bracket bolts 346 are received through bracket holes 342 and square beam holes 344 and act to rigidly mount square beams 304 along with the frame to brackets 332 along with U-member 22 and shaft 20. Brackets 332 can be attached to square beams 304 by welding or other suitable means, however, the preferred method is to use bolts 346 as shown in FIG. 10 so as to provide a means by which frame 300 and the solar panels or collectors attached thereto can be removed and serviced if necessary.

As can be appreciated, the above-described mounting assembly for pivotally connecting solar panels or collectors to the selectively rotatable shaft 20 substantially reduces the cost of manufacturing by reducing the quantity of materials needed, utilizing substantially the same type of materials throughout and also by reducing the time needed to assemble the same. In addition, the mounting assembly provides a rigid structure capable of withstanding forces to which the solar panels and collectors are subjected to, such as those created by winds, snow, etc.

Figure 5B:
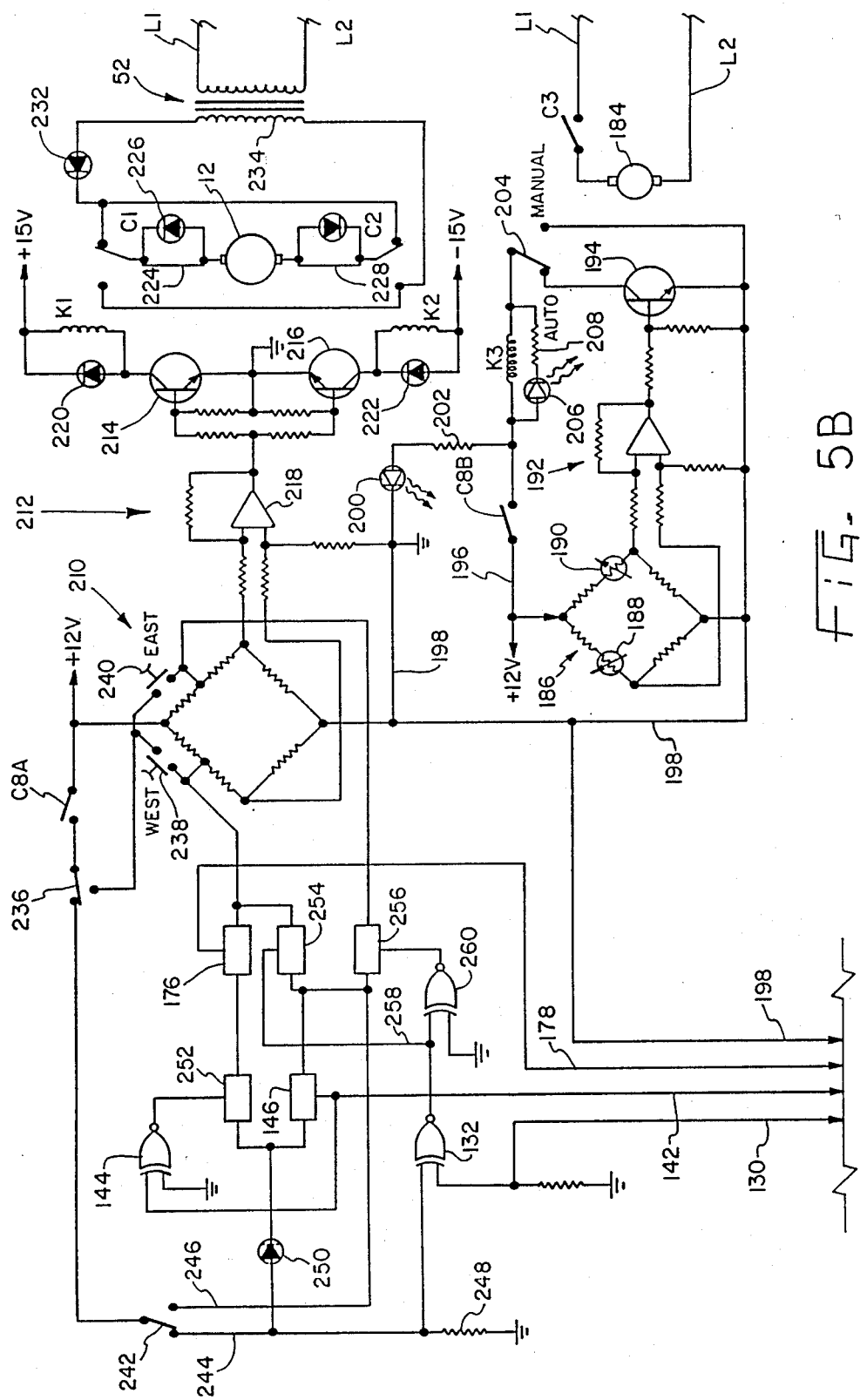

Referring now to FIGS. 5a and 5b, the electronic circuitry of the solar tracking control system will be described. Power is supplied to the solar tracking control system from a 120 volt, 60 Hz outlet through two lines indicated as L1 and L2. A power supply fuse 50 is provided on L2. Transformer 52 reduces the voltage to an appropriate working voltage such as 28 volts. Full wave rectifier 54 is connected to the secondary winding of transformer 52 and provides a positive 15 volt and a negative 15 volt output. Power supply capacitors 56 and power supply resistors 58 are connected between the respective positive 15 volt output and negative 15 volt output of full wave rectifier 54 and the center tap line of transformer 52 acting as ground. A 12-volt regulator 60 is provided and is connected to the positive 15-volt output of full wave rectifier 54 and the center tap output of transformer 52. Capacitors 66 are connected between the output of regulator 60 and the center tap output of transformer 52 and, thus, a 12-volt regulated output is provided as shown.

A plurality of time dependent signals are created for triggering the various electrical components of the solar tracking control system through the use of a time controlled signal programmer means or signal programmer generally designated as 68. To this end, diode 70 is connected to the above-described 28-volt 60 Hz supply. The half-wave rectified output of diode 70 is connected in series to resistor 72 and to one of the inputs of NAND gate 74. The other input of NAND gate 74 is connected to the regulated positive 12-volt output of regulator 60. The output of NAND gate 74 is connected in series with dividers 76, 78 and 80, each of which divide by 60. Dividers 76, 78 and 80 are commonly known as presettable divide by n counters and are set at divide by 60. Thus, the output 82 of divider 76 is one cycle per second, the output 84 of divider 78 is one cycle per minute, and the output 86 of divider 80 is one cycle per hour. The output 86 of divider 80 is connected to invertor 88 which, in turn, is connected to divider 90 having outputs of $Q_2$ at one cycle per 4 hours, $Q_3$ at one cycle per 8 hours, $Q_4$ at one cycle per 16 hours and, $Q_5$ at one cycle per 32 hours. $Q_2$, $Q_3$, $Q_4$, and $Q_5$ are shown diagrammatically in FIG. 6. Divider 90 is a seven stage binary counter and is set to divide by 24.

Divider 90 operates on 12 volts and can be reset by providing a signal on reset line 92. Reset line 92 is connected to the output of NAND gate 94. One input of NAND gate 94 is connected to the output of NAND gate 96 which, in turn, is connected to outputs $Q_4$ and $Q_5$ of divider 90. The other input of NAND gate 94 is connected to line 98, which is connected to normally open reset switch 100 leading to ground. Line 98 is also connected to an integrator consisting of resistor 102 and capacitor 104, which are, in turn, connected to a positive 12 volts. Thus, dividers 78, 80 and 90 can be reset by merely depressing reset switch 100. In the alternative, dividers 78, 80 and 90 are reset automatically via the output of NAND gate 94, which is dependent on the outputs $Q_4$ and $Q_5$ of divider 90.

The solar tracking control system is selectively automatically activated through the use of a power switch means generally designated as 106. Power switch means 106 includes coil K8, which is connected to and is adapted to pull closed contacts C8A and C8B. Coil K8 is activated through the use of NPN transistor 114 which, in turn, is activated through the use of a power signal generating means for generating a power signal in response to time dependent signals $Q_3$, $Q_4$, and $Q_5$ of divider 90. The power signal for activating coil K8 through the use of NPN transistor 114 is generated through the use of NOR gates 110 and 112 and invertor 108. The Boolean logic representing the system energizing and de-energizing power signal necessary to activate NPN transistor 114 is $\overline{Q_3+\overline{Q_4}+Q_4+Q_5}$. Resistor 116 is connected in series with the output of NOR gate 112 and resistor 118 is connected in series with the output of NOR gate 110. Resistor 120 is connected between the base of NPN transistor 114 and ground. Accordingly, through the use of the power signal generating means, a power signal is produced as shown in FIG. 6 and coil K8 is energized and contacts C8A and C8B are closed over a period of twelve hours. More specifically, as shown in FIG. 6, the power signal is high between 7:00 a.m. and 7:00 p.m., during which time the solar tracking control system is energized.

An east/west signal generating means is provided for generating an east/west signal in response to time dependent signals $Q_2$ and $Q_4$ and the output of NOR gate 112. East/west signal generating means includes NAND gate 122 having a first input of $Q_2$ and a second input of $Q_3$ from divider 90. The output of NAND gate 122 is connected to a first input of NAND gate 124. The second input of NAND gate 124 is connected to the output of NOR gate 112. The Boolean logic representing the east/west signal generating is $\overline{Q_2 \cdot Q_3 \cdot Q_4 + Q_5}$. Accordingly, the output of NAND gate 124 generates the east/west signal shown in FIG. 6.

Resistor 126 and light-emitting diode 128 are connected in series between the output of NAND gate 124 and a 12-volt supply. Accordingly, light-emitting diode 128 lights up and indicates the time during which the east/west signal is low. It should be noted that the output of NAND gate 124 or the east/west signal is connected via line 130 to one of the inputs of exnor gate 132. Thus, line 130 and the respective input of exnor gate 132 is low from 7:00 a.m. until 1:00 p.m. and high, thereafter, as more clearly shown in FIG. 6.

A fixed automatic signal is also generated through the use of a fixed automatic signal generating means in response to time dependent signals $Q_3$ and the output of NOR gate 112. More specifically, the fixed automatic signal is provided at the output of exnor gate 134 having a first input from NOR gate 136 and a second input connected to ground. NOR gate 136 has a first input connected to invertor 138 which, in turn, is connected to $Q_3$ of divider 90. The second input of NOR gate 136 is connected to invertor 140 which, in turn, is connected to the output of NOR gate 112. Thus, the fixed automatic signal, which is low from 11:00 a.m. until 3:00 p.m. and high at all other times as shown in FIG. 6, is applied to line 142 which is connected to one of the inputs of exnor gate 144 and to solid state relay, more commonly known as a field effect device 146. Thus, a low signal is provided via line 142 to solid state relay or contact 146 and to exnor gate 144 between 11:00 a.m. and 3:00 p.m. and a high signal is provided thereto at all other times. The Boolean logic representing the fixed automatic generator is $\overline{Q_3 \cdot Q_4 \cdot Q_5}$. It should be further noted that light-emitting diode 148 and resistor 150 are connected in series between line 142 and a 12-volt supply thereby indicating the time of which the fixed automatic signal is low.

Figure 6A:
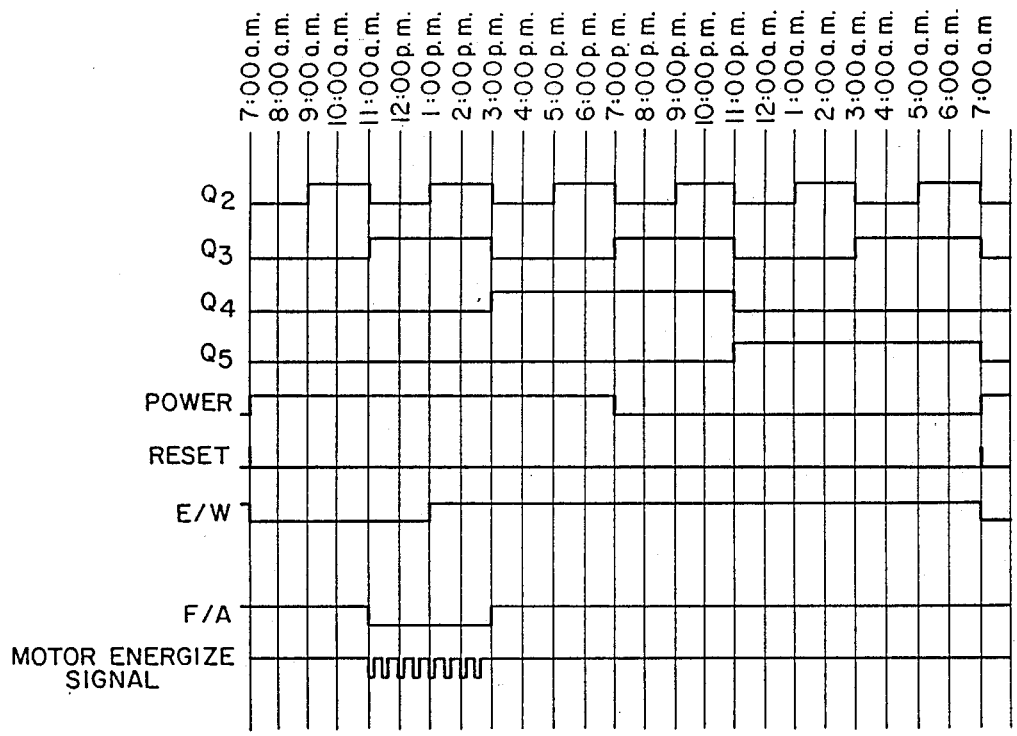
FIGS. 6a and 6b are signal diagrams generally depicting some of the various signals generated by the solar tracking control system according to the present invention.
Figure 6B:
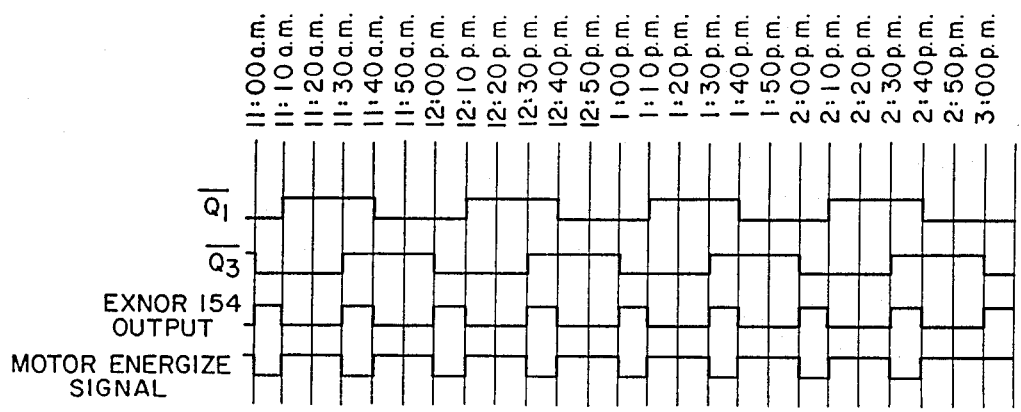

A gate means is provided for generating motor energizing signals in response to the fixed automatic signal and the motor energizing signals generated via time dependent signals $Q_1$ and $Q_3$ of divider 80. More specifically, the output of NAND gate 152 provides the periodic motor energizing signals as shown in FIG. 6. That is, exnor gate 154 has a first input of $Q_1$ and a second input $Q_3$ as more clearly shown in FIG. 6b. Exnor gate 154 has an output signal also shown in FIG. 6b and is connected to an input of NAND gate 152. The other input of NAND gate 152 is connected to invertor 156 which, in turn, is connected to the output of exnor gate 134 which provides the fixed automatic signal. Accordingly, the output of NAND gate 152 is the motor energizing signal as shown in FIGS. 6a and 6b. It should be noted that the motor energizing signal is connected to a latch means or, more particularly, to a cross coupled NAND gate cell generally indicated as 158 for the purpose of setting the same and causing motor 12 to be energized moving solar panel 10 westerly as will be described hereinbelow.

A means for detecting the degree of pivot of the solar panel and for resetting cross coupled NAND cell 158 by providing a motor de-energizing signal in response to detecting a preselected degree of pivot and, thereby, selectively stopping the westerly movement of solar panel 10 is provided. More specifically, motor 12 is mechanically coupled to a hall-effect generator 164 whereby a preset number of electrical signals are created by every predetermined number of revolutions by motor 12. Hall sensor 160 senses the signals created by generator 164 and is connected to exnor gate 166. The other input of exnor gate 166 is connected to ground. The output of exnor gate 166 is connected to synchronous programmable 4-bit counter 162. It should be noted that both hall sensor 160 and counter 162 are connected to a 12-volt supply line and ground as shown. Synchronous programmable 4-bit counter 162 is programmed to count down from a 4-bit binary digit through the use of switches generally indicated as 168 connected to a 12-volt source. Thus, when a preselected number of pulses coming from hall sensor 160 and exnor gate 166 are counted by counter 162, a reset signal is provided to reset line 170 thereby resetting cross coupled NAND cell 158. It should be noted that counter 162 also resets itself each time it provides a reset signal on line 170 via line 178. Further, through capacitors 172 and resistors 174, cross coupled NAND gate cell 158 sets and resets only upon the occurrence of a change of voltage i.e., from high to low or from low to high. More specifically, cross coupled NAND gate cell 158 is set when the motor energizing signal goes from high to low and remains set until line 170 goes from high to low. It should also be noted that the output of cross coupled NAND gate cell 158 is connected to solid state relay or contact 176 via line 178. Counter 162 is also connected to line 142 carrying the fixed automatic signal and is thereby kept in a reset position between 3:00 p.m. and 11:00 a.m. when the fixed automatic signal is high.

So as to remove the energy collected by solar panel 10 and store the same, an energy bank such as a water storage tank 180 is connected to solar panel 10. In essence, storage tank 180 is fluidly connected to solar panel 10 via water lines 182 and a water pump 184 is connected to one of the water lines 182 so as to circulate water between solar panel 10 and water storage tank 180. As shown in FIG. 5b, water pump 184 is electrically powered via lines L1 and L2 which are connected thereto and is selectively energized and de-energized through the use of contact C3, which is controlled with coil K3. Coil K3 is itself energized when the temperature of solar panel 10 exceeds the temperature of water storage tank 180 by approximately 3 degrees Fahrenheit which may be preselected. This temperature difference is sensed by using a bridge 186 having on one leg thereof storage tank thermistor 188 sensing the water temperature within storage tank 180 and on the other leg solar panel thermistor 190 sensing the water temperature within solar panel 10. The imbalance of bridge 186 is sensed and amplified through temperature control OP AMP circuit 192 which, in turn, is connected to the base of temperature control transistor 194. Transistor 194 causes coil K3 to be energized thereby pulling contact C3 and, thereby, energizing water pump 184 whenever an imbalance in bridge 186 occurs. The resistors used within bridge 186 and within temperature control OP AMP circuit 192 are size according to general electronic standards. Further, bridge 186 is connected between 12-volt supply line 196 and line 198 connected to the center tap of transformer 52.

A contact C8B is connected to 12-volt supply line 196 and closes in response to coil K8 thereby providing power to the water pump control circuitry in response to the power signal. Light-emitting diode 200 and resistor 202 are connected in series between ground and contact C8B thereby providing a visual indication as to when power is provided to the water pump control circuitry and the solar tracking control system in general. Coil K3 is connected between contact C8B and pump manual/automatic switch 204 and light-emitting diode 206 and resistor 208 are connected in parallel with coil K3. Thus, light-emitting diode 206 provides a visual indication whenever coil K3 or water pump 184 are energized. Switch 204 is shown in the automatic position whereat coil K3 will automatically be energized upon the occurrence of an imbalance in bridge 186. In the alternative, switch 204 may be placed in the manual position whereat coil K3 and pump 184 are energized regardless of any imbalance occurrence in bridge 186.

The direction of motor 12, which is powered via a 28-volt 60 Hz supply from transformer 52, is controlled through the use of motor control bridge 210, motor control OP AMP circuit 212 and coils K1 and K2, which are controlled by transistors 214 and 216, respectively. More specifically, each input of OP AMP 218 is connected to a respective leg of motor control bridge 210. Thus, the output of OP AMP 218 is either zero, positive or negative, depending on the imbalance of motor control bridge 210. The output of OP AMP 218 is connected to the respective bases of NPN transistor 214 and PNP transistor 216. Accordingly, either coil K1 or coil K2 can be energized during any particular period of time but not both. Diode 220 is connected in parallel with coil K1 and diode 222 is connected in parallel with coil K2. The resistors of motor control bridge 210 and motor control OP AMP circuit 212 are sized according to general electrical standards.

Motor 12, on one end thereof, is connected to west limit switch 224, and diode 226 which are parallel with each other and at the other end thereof are, in turn, connected to contact C1. At the other end thereof, motor 12 is connected to east limit switch 228 and diode 230, which are connected parallel to each other and are further connected to contact C2 at the other end thereof. Diode 232 is connected in series with secondary winding 234 of transformer 52 thereby providing rectified current to motor 12. Both contacts C1 and C2 are shown in their normally closed positions when coils K1 and K2 are not energized. West limit switch 224 and east limit switch 228 are physically situated substantially near the end of the desired pivot of solar panel 10 in the respective westerly or easterly direction and open when solar panel 10 substantially reaches that position thereby opening a respective limit switch 224 or 228 and causing motor 12 and the pivoting of solar panel 10 to stop. Thereafter, due to the open limit switch, motor 12 will operate only when the correct contact C1 or C2 closes, thereby causing motor 12 to pivot solar panel 10 in the opposite direction of that which caused the opening of the limit switch. More specifically, during normal operation, coil K1 is energized pulling closed contact C1 and causing solar panel 10 to move westerly. When solar panel 10 has been pivoted substantially to the end of the desired angle, west limit switch 224 will open and motor 12 will stop regardless of whether contact C1 is closed or open. Thereafter, only the energizing of coil K2 pulling closed contact C2 will allow motor 12 to be energized with current flowing through diode 226 and, thereby, causing solar panel 10 to move in the easterly direction. It should be noted that, in general, the same operation occurs when the substantially furthest easterly pivot is reached, however, in that position, east limit switch 228 is opened.

Connected in series with contact C8A, there is manual override solar panel control switch 236 shown in its normally closed position. Switch 236, along with west manual override switch 238 and east manual override switch 240 are provided for imbalancing bridge 210 so as to make solar panel 10 pivot in the desired direction regardless of the automatic solar tracking control system described hereinabove. That is, west manual override switch 238 is provided for imbalancing bridge 210 so as to make solar panel 10 pivot westerly and east manual override switch 240 is provided so as to imbalance bridge 210 and cause solar panel 10 to pivot easterly.

An overload determining means for determining substantially when the energy bank or storage tank 180 is substantially full or when solar panel 10 has reached a critical level or temperature and switch means connected to the above-described east/west signal generating means and the overload determining means for overriding the latch means and pivoting the solar panel away from direct sunlight in response to an overload determination and in response to the east/west signal is described hereinbelow. More specifically, temperature sensitive switch 242 is connected to manual override solar panel control switch 236 and is normally in the position shown in FIG. 5b whereat 12-volts is provided to line 244. When the temperature of storage tank 180 is below substantially 140 degrees Fahrenheit or some other preselected temperature, temperature sensitive switch 242 remains in its normal operating position as shown. Switch 242 is substantially a bimetallic strip-type thermostat situated so as to sense the temperature of the water within solar panel 10 or storage tank 180 and to provide an overtemperature control signal whenever a preselected temperature such as 140 degrees Fahrenheit is exceeded. In the alternative, temperature sensitive switch 242 can be a preset thermosnap disk control switch. Accordingly, whenever the preselected temperature is exceeded, switch 242 opens and provides 12-volts on line 246.

Line 244 is connected to one of the inputs of exnor gate 132 and to ground via resistor 248. Line 244 is also connected to diode 250 which, in turn, is connected to solid state relay 146 and solid state relay 252. It should be noted that solid state relay 146 is controlled via line 142 and solid state relay 252 is controlled via the output of exnor gate 144. The output of relay 252 is connected to the input of relay 176 which, as described hereinbelow, is controlled via line 178. The output of relay 176 is connected to the west leg of motor control bridge 210. The output of solid state relay 146 is connected to the inputs of solid state relays 254 and 256. It should be noted that line 246 is also connected to the inputs of solid state relays 254 and 256. Further, solid state relay 254 is controlled via line 258 which is the output of exnor gate 132. Line 258 is also connected to one of the inputs of exnor gate 260. The other input of exnor gate 260 is connected to ground. The output of exnor gate 260 controls solid state relay 256 which, in turn, has an output connected to the east leg of motor control bridge 210.

The operation of the solar tracking control system will be described hereinbelow. At substantially 7:00 a.m., the output of NAND gate 94 goes high and thereby resets dividers 78, 80, and 90 via reset line 92. At that point, the power signal goes high, coil K8 is closed, and contacts C8A and C8B are closed thereby providing power to the solar tracking control system and indicating the occurrence of this event via light-emitting diode 200. Simultaneously, the east/west signal on line 130 is low and the fixed automatic signal on line 142 is high. Accordingly, if temperature sensitive switch 242 is in its normal operating position as shown, the output of exnor gate 132 is low and, thus the output of exnor gate 260 is high. Further, because the fixed automatic signal is high on line 142, the output of exnor gate 144 is low and solid state relay 146 is closed thereby allowing current to flow through diode 250, relay 146 and solid state relay 256 and to the east leg of bridge 210. Accordingly, coil K2 is energized and contact C2 is opened thereby causing solar panel 10 to move easterly until east limit switch 228 is opened.

If at 7:00 a.m., after resetting, the temperature sensitive switch is triggered and thus connected to line 246, the output of exnor gate 132 is high thereby closing solid state relay 256 and opening solid state relay 254 thereby allowing current to flow through line 246 and solid state relay 254 to the west leg of motor control bridge 210 thereby causing solar panel 10 to move westerly if not already in the westerly position until west limit switch 224 is opened.

At substantially 11:00 a.m., the fixed automatic signal goes low as shown in FIG. 6a, and the motor energize signal also goes low for a period of 10 minutes as shown in FIGS. 6a and 6b. Accordingly, cross coupled NAND gate cell 158 is set and a high signal is provided on line 178 thereby closing solid state relay 176. Further, because the fixed automatic signal carried on line 142 is low, solid state relay 146 is open and because the output of exnor gate 144 is caused to be high, solid state relay 252 is closed. Accordingly, so long as temperature sensitive switch 242 remains in its normal position as shown, current is allowed to travel through diode 250, closed relays 252 and 176, and to the west leg of motor control bridge 210 thereby energizing coil K1 and closing contact C1 energizing motor 12 and causing solar panel 10 to move in the westerly direction. As soon as motor 12 starts to rotate, however, hall sensor 160 generates pulses which travel through exnor gate 166 and are counted by counter 162. Thereafter, when a preselected number of pulses coming from hall sensor 160 are counted by counter 162, a reset signal is provided on reset line 170 thereby resetting cross coupled NAND gate cell 158 and, also, resetting counter 162 via line 178. Accordingly, line 178 then goes low thereby opening solid state relay 252 and closing solid state relay 146 and, thereby, also de-energizing motor 12 and causing solar panel 10 to stop pivoting. As can be appreciated, the above-described sequence of events whereby the cross coupled NAND gate cell 158 is set and reset occurs periodically each half hour as indicated by the motor energize signal shown in FIGS. 6a and 6b. In this fashion, because the motor energizing signal is time dependent, solar panel 10 is caused to pivot so as to be substantially always perpendicular to the sun.

It should be noted that between 7:00 a.m. and 1:00 p.m., if temperature sensitive switch 242 is caused to open and provide current to line 246, solar panel 10 will be moved in the westerly direction generally away from direct sunlight due to the low east/west signal. This is because upon such an occurrence, the output of exnor gate 132 will be high thereby closing solid state relay 254 and opening relay 256 and, thus, causing current to flow through line 246 and solid state relay 254 to the west leg of motor control bridge 210.

Between 1:00 p.m. and 7:00 p.m. however, the east/west signal on line 130 goes high so that if the temperature sensitive switch 242 opens and makes contact with line 246, the output of exnor gate 132 is low and, thus, the output of exnor gate 260 is high causing solid state relay 256 to close and solid state relay 254 to open. Accordingly, current flows through line 246 and relay 256 to the east leg of motor control bridge 210 and causes solar panel 10 to be pivoted in the easterly direction away from direct sunlight until east limit switch 228 is opened.

At 3:00 p.m., the fixed automatic signal goes high and, therefore, no further setting of cross coupled NAND gate cell 158 can occur as also shown by the motor energize signal of FIG. 6a. Further, solid state relay 146 is closed and solid state relay 252 is open. Further yet, solid state relay 254 is closed because the output of exnor gate 132 is high due to the east/west signal on line 130 being high and a voltage being provided on line 244. Accordingly, current is allowed to travel through diode 250, relays 146 and 254 to the west leg of motor control bridge 210, thereby causing solar panel 10 to travel the remainder of the way westerly until west limit switch 224 is opened. Solar panel 10 will remain in this most westerly position until the next day at 7:00 a.m. when the system is again automatically reset and solar panel 10 is caused to move to its full easterly position. It should be noted that counter 162 is reset via line 262 upon the fixed automatic signal going high.

Furthermore, if between 3:00 p.m. and 7:00 p.m., an overtemperature or overload situation occurs and temperature sensitive switch 242 is caused to provide current on line 246, the output of exnor gate 132 becomes low and the output of exnor gate 260 becomes high thereby allowing current to flow through line 246 and relay 256 to the east leg of motor control bridge 210 and thereby causing solar panel 10 to be pivoted to its full easterly fixed position until east limit switch 228 is opened.

At 7:00 p.m. the power signal goes low and contacts C8A and C8B are caused to open thereby preventing power from being supplied to the solar tracking control system until the next day at 7:00 a.m. when the system is again reset automatically. As can be appreciated at 7:00 a.m. of the next day, the above-described operation is repeated.

It should further be noted that the above-described solar tracking control system is originally set by synchronizing the signal programmer with the time of day by depressing reset switch 100 at approximately 7:00 a.m. Thereafter, as described above, the system automatically resets itself at that same time and operates without any further input from the operator.

While the invention has been described as having specific embodiments, it will be understood that it is capable of further modifications which are equivalent thereto. This application is therefore intended to cover any variations, uses or adaptations of the invention following the general principles thereof and including such departures from the present disclosure as come within known or customary practice in the art to which this invention pertains.

What is claimed is:

1. A mounting assembly for pivotally connecting a solar panel or collector to a selectively rotatable shaft, said mounting assembly comprising:
    a frame whereupon the solar panel or collector can be mounted;
    a U-member having two legs connected to a middle portion, said middle portion connected to said frame; and,
    wherein said two legs are connected to the selectively rotatable shaft, said U-member, frame and the solar panel or collector being pivoted about the shaft by rotating the shaft.

2. The mounting assembly of claim 1 wherein said U-member legs are substantially parallel to one another and said middle portion is substantially perpendicular to said legs.

3. The mounting assembly of claim 2 further comprising a substantially flat reinforcing wall connected to said middle portion and both of said legs whereby said legs are kept substantially perpendicular to said middle portion.

4. The mounting assembly of claim 3 further comprising a second substantially flat reinforcing wall connected to the said middle portion and both of said legs whereby said legs are kept substantially perpendicular to said middle portion.

5. The mounting assembly of claim 1 further comprising a mounting bracket connected to one of said legs and to said frame for rigidly connecting said frame to said U-member.

6. The mounting assembly of claim 5 further comprising a second mounting bracket connected to the other of said legs and to said frame for rigidly connecting said frame to said U-member.

7. The mounting assembly of claim 1 wherein said legs are substantially flat, each having an inner face and an outer face, said middle portion being flat and having an inner face and an outer face and wherein said middle portion is substantially perpendicular to both of said legs.

8. The mounting assembly of claim 7 wherein said middle portion is integrally connected to each of said legs.

9. The mounting assembly of claim 7 further comprising a substantially flat reinforcing wall connected to said middle portion and both of said legs whereby said legs are kept substantially perpendicular to said middle portion.

10. The mounting assembly of claim 9 further comprising a second substantially flat reinforcing wall connected to the other side of said middle portion and both of said legs whereby said legs are further kept substantially perpendicular to said middle portion.

11. The mounting assembly of claim 7 further comprising a substantially flat mounting bracket having an inner face and an outer face, said mounting bracket connected to one of said legs with the mounting bracket inner face opposing said one leg outer face, said bracket being connected to said frame.

12. The mounting assembly of claim 11 wherein a portion of said mounting bracket extends beyond said one of said legs and said U-member middle portion, said extending portion of said mounting bracket being connected to said frame.

13. The mounting assembly of claim 12 further comprising a second substantially flat mounting bracket having an inner face and an outer face, said second mounting bracket connected to the other of said legs with the second mounting bracket inner face opposing the other of said legs outer face, said bracket being connected to said frame.

14. The mounting assembly of claim 13 wherein a portion of said second bracket extends beyond said other of said legs and said U-member middle portion, said extending portion of said second bracket being connected to said frame.

15. The mounting assembly of claim 1 further including a motor connected to the rotatable shaft for selectively rotating the same and, a base, said motor and rotatable shaft being mounted and supported on said base.

16. A mounting assembly for pivotally connecting a solar panel or collector to a selectively rotatable shaft, said mounting assembly comprising:
    a frame whereupon the solar panel or collector can be mounted;
    a U-member having two substantially flat legs, each of said legs having an inner face and an outer face and being connected to a middle flat portion having an inner face and an outer face and wherein said middle portion is substantially perpendicular to both of said legs;
    two substantially flat mounting brackets each having an inner face and an outer face, one of said mounting brackets connected to one of said legs with the mounting bracket inner face opposing said one leg outer face and being connected to said frame, said other mounting bracket connected to the other of said legs with the mounting bracket inner face opposing said other leg outer face and being connected to the frame;
    two substantially flat reinforcing walls, each of said walls connected to said middle portion and both of said legs whereby said legs are kept substantially perpendicular to said middle portion; and,
    wherein said two legs are connected to the selectively rotatable shaft, said U-member, frame and the solar panel or collector being pivoted about the shaft by rotating the shaft.

17. The mounting assembly of claim 16 wherein said mounting brackets extend beyond said legs and said U-member middle portion and wherein said extending part of said brackets are connected to said frame.

18. The mounting assembly of claim 17 further including a motor connected to the rotatable shaft for selectively rotating the same and, a base, said motor and rotatable shaft being mounted and supported on said base.

19. A mounting assembly for pivotally connecting a solar panel or collector to a base, said mounting assembly comprising:
- a frame whereupon the solar panel or collector can be mounted;
- a first plate connected to said frame, said plate having a pivot hole and a plurality of angle displacement holes each being equidistant from said pivot hole;
- a second plate connected to the base and situated substantially parallel to said first plate, said second plate having a pivot hole and an angle displacement hole being situated substantially the same distance apart from said second plate pivot hole as said distance between said pivot and displacement holes of said first plate;
- a pivot shaft received through said first plate pivot hole and said second plate pivot hole whereby said frame and first plate can pivot with respect to said second plate and the base;
- an angle displacement shaft selectively received through said second plate angle displacement hole and any one of said first plate angle displacement holes whereby said frame and first plate can be selectively angularly fixed with respect to said second plate and the base;
- a U-member having two legs, said second plate being connected to said U-member; and,
- a selectively rotatable shaft situated substantially perpendicular to the axis of rotation between said first and second plates and being pivotally mounted on the base, said two legs connected to the selectively rotatable shaft whereby the frame is pivoted about the selectively rotatable shaft axis of rotation by pivoting said rotatable shaft.

* * * * *